(12) United States Patent
Sohrt et al.

(10) Patent No.: US 6,220,556 B1
(45) Date of Patent: Apr. 24, 2001

(54) UNIVERSALLY ADJUSTABLE MOUNTING SYSTEM FOR SWITCHES, OR THE LIKE

(76) Inventors: Thomas M. Sohrt; Carrie Sohrt-McCormick, both of P.O. Box 10028, Costa Mesa, CA (US) 92627

( * ) Notice: Subject to any disclaimer, the term of this patent is extended or adjusted under 35 U.S.C. 154(b) by 0 days.

(21) Appl. No.: 09/322,188

(22) Filed: May 28, 1999

(51) Int. Cl.$^7$ ........................................... F16C 11/06
(52) U.S. Cl. ................ 248/279.1; 403/56; 248/278.1; 248/288.31
(58) Field of Search ............... 248/276.1, 284.1, 248/286.1, 278.1, 274.1, 288.31, 288.51, 291.1, 181.1, 292.12, 292.11, 230.3, 230.5, 279.1; 403/56, 90, 141

(56) References Cited

U.S. PATENT DOCUMENTS

| | | | |
|---|---|---|---|
| 173,046 | * | 2/1876 | Nix .......................................... 403/56 |
| 180,881 | * | 8/1876 | Howson .................................. 403/56 |
| 538,534 | * | 4/1895 | O'Neill .................................... 403/56 |
| 855,149 | * | 5/1907 | Vaughn et al. ......................... 403/56 |
| 1,382,783 | * | 6/1921 | Howard ................................... 403/56 |
| 1,460,697 | * | 7/1923 | Bendlin ................................... 403/56 |
| 1,509,068 | * | 9/1924 | Herron .................................... 403/56 |
| 2,560,556 | * | 7/1951 | Creedon .................................. 403/56 |
| 2,573,443 | * | 10/1951 | Holland ............................. 248/284.1 |
| 2,650,788 | * | 9/1953 | Hulstein .......................... 248/288.51 |
| 2,652,221 | * | 9/1953 | Kampa .................................... 403/56 |
| 3,999,731 | * | 12/1976 | Filip ...................................... 248/107 |
| 4,382,572 | * | 5/1983 | Thompson ............................... 403/56 |
| 4,431,329 | * | 2/1984 | Baitella .............................. 248/276.1 |
| 4,458,870 | * | 7/1984 | Duncan et al. ................... 248/279.1 |
| 4,491,435 | * | 1/1985 | Meier ................................ 248/276.1 |
| 4,606,522 | * | 8/1986 | Heifetz ............................. 248/276.1 |
| 4,936,533 | * | 6/1990 | Adams et al. .................... 248/276.1 |
| 4,941,481 | * | 7/1990 | Wagenknecht ........................ 403/90 |
| 5,033,528 | * | 7/1991 | Volcani .................................. 403/56 |
| 5,128,841 | * | 7/1992 | Maglica et al. ................. 248/288.31 |
| 5,664,750 | * | 9/1997 | Cohen ............................. 248/288.31 |
| 5,845,885 | * | 12/1998 | Carnevali .......................... 248/118.1 |
| 5,921,694 | * | 7/1999 | Herbermann ................... 248/288.51 |
| 5,927,815 | * | 7/1999 | Nakamura et al. .............. 248/276.1 |
| 5,937,881 | * | 8/1999 | Villa ................................ 248/288.51 |
| 5,964,493 | * | 10/1999 | Johnson ........................... 248/276.1 |

OTHER PUBLICATIONS

Fergusson's Complete Specification #6,414, Mar. 1906.*

* cited by examiner

Primary Examiner—Ramon O. Ramirez
Assistant Examiner—Jon Szumny
(74) Attorney, Agent, or Firm—James G. O'Neill

(57) ABSTRACT

A mounting system having a first arm and a second arm adjustably held together. An upper portion of the first arm is pivotably mounted in a first clamp that is pivotably held in a second clamp. The first and second arm are rotatably secured to a pair of mounting plates, and include a top tray pivotably and rotatably mounted at the top end of the first arm, so that a switch, or the like, supported on the top tray, may be moved to any desired position.

17 Claims, 2 Drawing Sheets

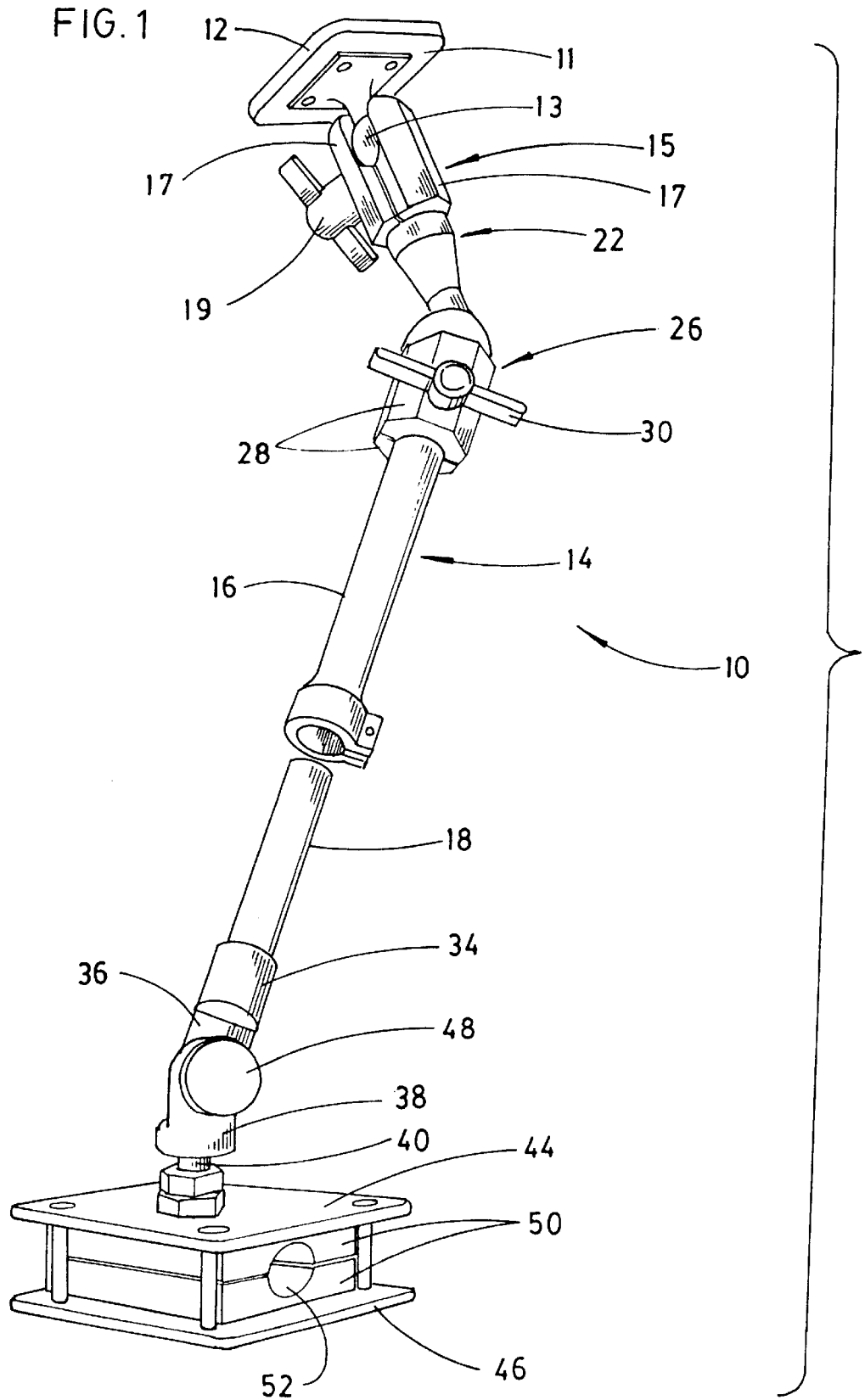

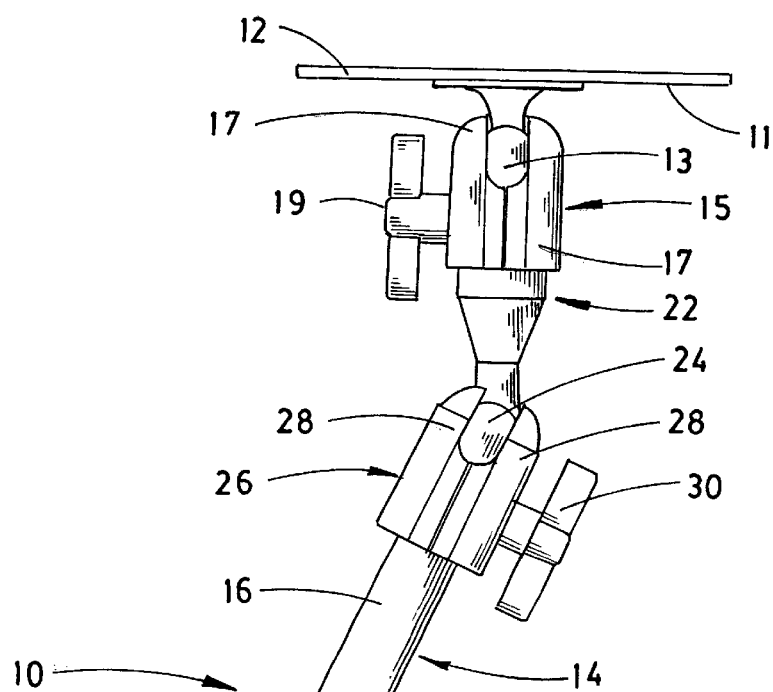
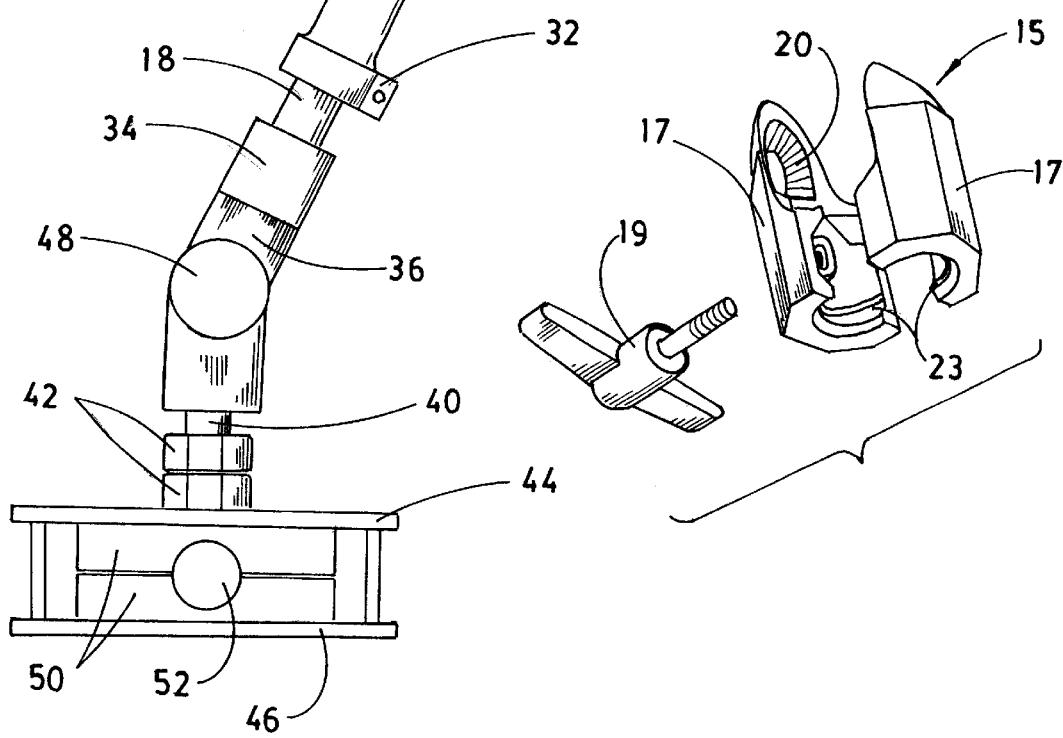

UNIVERSALLY ADJUSTABLE MOUNTING SYSTEM FOR SWITCHES, OR THE LIKE

BACKGROUND OF THE INVENTION

1. Field of the Invention

This invention relates generally to mounting systems, and, more particularly, to a universally adjustable mounting system for switches and lightweight devices used on wheelchairs, and the like.

2. Description of Related Art

Mounting systems are well known for use in helping persons with various disabilities and/or needs. However, persons aiding people with disabilities have trouble adjusting or using known mounting systems, or find it impossible to adjust such known systems properly so they work on wheelchairs, or the like. Therefore, many persons are forced to utilize more than one system, to jury rig their own systems, or to make due with an inadequate system that is difficult to use. This is particularly true when working with disabled persons in wheelchairs, who cannot use their hands to activate switches, or to manipulate other lightweight devices. There, therefore, is a long felt need in the art for a mounting system that is universally adjustable, and which may be easily mounted on wheelchairs, walkers, hospital beds, strollers, tables, and the like, for supporting switches and other lightweight devices to be used by persons with disabilities.

SUMMARY OF THE INVENTION

Accordingly, it is a general object of the present invention to provide an improved adjustable mounting system. It is a particular object of the present invention to provide an improved universally adjustable mounting system, easily mounted to different shaped holding or supporting elements, on a wheelchair, or the like. It is a still more particular object of the present invention to provide an improved universally adjustable mounting system that allows switches and other lightweight items to be positioned at an optimum level and/or angle, so as to be easily utilized by a person with disabilities. It is yet another particular object of the present invention to provide an improved universally adjustable mounting system that may be supported on substantially any shaped portion of a wheelchair, or the like, in any desired position. And, it is still another particular object of the present invention to provide an improved universally adaptable mounting system for a switch, or the like, for use by persons with disabilities which may be pivoted and telescoped so as to provide ready access to persons with disabilities.

BRIEF DESCRIPTION OF THE DRAWINGS

The objects and features of the present invention, which are believed to be novel, are set forth with particularity in the appended claims. The present invention, both as to its organization and manner of operation, together with further objects and advantage may best be understood by reference to the following description, taken in connection with the accompanying drawings, wherein:

FIG. 1 is a partially exploded perspective view of an improved mounting system of the present invention;

FIG. 2 is a side elevational view of the mounting system of FIG. 1; and

FIG. 3 is an enlarged perspective view of a securing means having complementary clam shell halves used in the mounting system of FIG. 1.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved universally adjustable mounting system for a switch, or the like, generally indicated at 10.

Referring to FIGS. 1–3 of the drawings, the mounting system 10 is comprised of a top support or tray 12 for supporting a switch or other lightweight device in any desired position. The support or tray 12 is pivotably secured to an adjustable, elongated arm 14, having a first tubular portion 16 and a telescoping second tubular portion 18. The top support or tray 12 includes a ball element 13 secured to a bottom surface 11 thereof. The ball element 13 is captured in a means for holding 15 having a pair of clam-shaped clamping elements 17 releasably secured together by a thumbscrew 19. As more clearly shown in FIG. 3, the clamping elements 17 include top semi-cylindrical, serrated or grooved inner portions 20, which capture the ball 13 therein, but which allow the ball 13 to pivot when loosened. Additionally, the clamping elements 17 include complementary lower slot portions 23, which capture a shaped top of a lower connecting element 22, having a further or second ball 24 formed at a lower end thereof. When the clamping elements 17 are loosened, the lower connecting element 22 may be rotated. The further or second ball 24 is captured in a further means for holding 26, having clam-shaped clamping elements 28, including a thumbscrew 30, for tightening the clam-shaped clamping elements 28 around the second ball 24, or loosening them to allow the second ball to pivot, and the clamping elements 28 to rotate around a specifically formed upper end of the tubular element 16. A lower or second end of tubular element 16 includes a means for holding 32, such as a clamp element, which releasably holds the telescoping lower arm 18. The length of the arm 14 is adjusted by loosening the clamping element 32, and pushing or pulling the tubular element 18 into or out of tubular element 16. A lower end 34 of the tubular element 18 is preferably formed with a flat surface 36 having a plurality of grooves or serrations therein, which grooves or serrations cooperate with matching grooves or serrations on a complementary flat upper end 38 of an arm 40 to form a rotatable connection. The arm 40 is secured, as by nuts 42, to a threaded portion, not shown, of an upper plate 44 of a pair of adjustable clamping or holding plates 44, 46.

The grooves or serrations in the complementary portions 36, 38 are held together by a securing means, such as a knurled handle 48. The adjustable clamping plates 44, 46 are easily attached to a rectangular holding element or bar (not shown) of a wheelchair, walker, or the like. The adjustable clamping plates are secured together at four corners thereof, by means of securing elements, such as nuts and bolts, passing through aligned openings in the adjustable clamping plates. If the mounting system of the present invention is to be clamped or held onto a wheelchair, or the like, having circular or oval-shaped elements, a pair of adapter blocks 50 are held therein to form an opening 52, which is circular or oval, to thus securely hold the circular or oval-shaped element therein. In this manner, the entire mounting system 10 may be clamped in a selected position on a wheelchair, or the like.

In use, when clamped onto a wheelchair, or the like, by the clamping plates 44, 46, and, if needed, the adapter blocks 50, the top support or tray 12 may be adjusted by loosening the knurled handle 48 to rotate the arm 14 around the rotatable connection, and, therefore, move the upper portion of the mounting system, with respect to the lower arm 40. Additionally, the clamp element 32 may be loosened to adjust the length of arm 14 by telescoping the tubular elements 1 6, 18, with respect to each other. Furthermore, the thumbscrews 19 and/or 30 may be loosened so as to loosen the clamping elements 15 and 26, so as to allow ball 24 to pivot or clamping element 26 to rotate, with respect to the upper end of tubular elements 16. At the same time, the tray 12 may be pivoted on the ball 13, or rotated around the upper end of element 22.

It, therefore, can be seen that the improved universal mounting system of the present invention provides a device that may be quickly and easily mounted on a wheelchair, walker, hospital bed, stroller, table, or the like, and adjusted to place a switch or other device on a tray 12, in a position for use by a person with disabilities. The tray may be moved to any convenient position, so that a confined person may operate a switch, or any other device held on the tray. The rotatable and pivotable joints of the mounting system allow the various elements thereof to be pivoted or rotated to different angles, or rotated 3600 around a vertical axis, for the convenience of a user.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A mounting system, comprising:
   an elongated, hollow body having a first arm and a second arm held together;
   a top support having a first ball secured to a lower surface; the first ball being held in a first end of a first clamping element;
   a second end of the first clamping element releasably holding a __upper end of a connecting element;
   a second ball secured to a bottom end of the connecting element and releasably mounted in a top end of a second clamping element;
   the second clamping element having a lower end holding a shaped upper end of the first arm;
   means for adjusting the length of the first arm and the second arm; and
   the second arm having a flat lower end, which flat lower end forms a part of a rotatable connection.

2. The mounting system of claim 2 wherein the first arm includes a clamp element for adjusting the length of said elongated, hollow, body.

3. The mounting system of claim 1 wherein the rotatable connection is secured to a pair of clamping plates.

4. The mounting system of claim 3, further including releasable adapter blocks held in the pair of clamping plates.

5. The mounting system of claim 4 wherein the first ball and the second ball are pivotably held in the first clamping element and the second clamping element.

6. The mounting system of claim 5 wherein the first clamping element and the second clamping element include thumbscrew tightening means.

7. The mounting system of claim 1 wherein the shaped upper end of the first arm is rotatably held in complimentary slot portions formed in the second clamping element.

8. The mounting system of claim 7 wherein the second arm has an enlarged, flat, lower end with a serrated portion, adjustably held to a matching serrated portion of a rotatable connection.

9. The mounting system of claim 9 wherein the first ball and the second ball are held between a pair of clamping elements in clam-shaped upper portions.

10. The mounting system of claim 9 wherein the second arm is an elongated, hollow, tubular body that telescopes into and out of the first arm, and is limited in sliding movement by a clamp device held on a lower end of the first arm.

11. The mounting system of claim 10 wherein the shaped upper end of the connecting element is held between slotted openings formed in a lower end of the first clamping element.

12. The mounting system of claim 11 wherein the first clamping element and the second clamping element releasably hold the first ball and the second ball and the shaped upper end of the connecting element and the shaped upper end of the first arm.

13. A mounting system, comprising:
    a first elongated, hollow arm;
    a second elongated arm, slidingly mounted in the first elongated, hollow arm;
    a top tray having a first ball secured to a lower surface, the first ball being held in a first clamping means;
    the first clamping means also capturing a shaped upper portion of a first element;
    the first element having a second ball formed on a lower portion;
    the second ball releasably captured in a pair of clam-shaped clamping elements; which clam-shaped clamping elements also releasably capture a shaped top portion of the first, elongated, hollow arm;
    the second, elongated arm being rotatably secured to a pair of holding plates; and
    the second, elongated arm having a flat lower end, which flat lower end forms part of a rotatable connection to the pair of holding plates.

14. The mounting system of claim 13 wherein the pair of holding plates have a further arm connected thereto.

15. The mounting system of claim 14, further including a pair of adapter blocks held between the pair of holding plates.

16. The mounting system of claim 15 wherein the second ball is releasably secured to the first clamping means by the first element.

17. A mounting system, comprising:
    an adjustable, elongated body, comprised of a top arm and a bottom arm telescopingly connected together; the bottom arm having a first tubular member, and a second flat member;
    a top tray secured to a first ball; the first ball held in a first pair of clamping elments;
    a connecting element having a first end rotatably captured in the first pair of clamping elements and a second ball releasably mounted in a second pair of clamping elements;
    the first pair of clamping elements and the second pair of clamping elements include thumbscrew tightening elements;
    a rotatable connection secured to the second flat member, away from the first tubular member;
    a pair of clamping plates mounted to the rotatable connection;
    a securing element mounted between the top arm and the bottom arm for locking the top arm and bottom arm together; and
    a further arm mounted between the rotatable connection and the pair of clamping plates.

* * * * *